United States Patent [19]
Allen

[11] Patent Number: 6,014,526
[45] Date of Patent: Jan. 11, 2000

[54] CAMERA WITH COMBINATION RELEASE BUTTON FOR SHUTTER AND WINDOW FOR FRAME COUNTER

[75] Inventor: Loretta E. Allen, Hilton, N.Y.

[73] Assignee: Eastman Kodak Company, Rochester, N.Y.

[21] Appl. No.: 09/192,897

[22] Filed: Nov. 16, 1998

[51] Int. Cl.[7] .................................................. G03B 17/24
[52] U.S. Cl. ............................................ 396/284; 396/535
[58] Field of Search .................................. 396/6, 535, 284

[56] References Cited

U.S. PATENT DOCUMENTS

| | | |
|---|---|---|
| 5,508,766 | 4/1996 | Boyd et al. . |
| 5,530,507 | 6/1996 | Boyd . |
| 5,537,176 | 7/1996 | Hara et al. . |
| 5,600,391 | 2/1997 | VanDeMoere et al. . |

*Primary Examiner*—David M. Gray
*Attorney, Agent, or Firm*—Roger A. Fields

[57] ABSTRACT

A camera comprising a manually depressible release button for a shutter, and a frame counter for indicating the number of exposures remaining to be made on a filmstrip, is characterized in that the release button is at least partially transparent and the frame counter is beneath the release button to permit the frame counter to be seen through the release button, whereby there is no need for a separate window for viewing the frame counter.

2 Claims, 2 Drawing Sheets

CAMERA WITH COMBINATION RELEASE BUTTON FOR SHUTTER AND WINDOW FOR FRAME COUNTER

FIELD OF THE INVENTION

The invention relates generally to the field of photography, and in particular to cameras. More specifically, the invention relates to a camera with a combination release button for a shutter and a window for a frame counter.

BACKGROUND OF THE INVENTION

Film and cameras that are all in one, commonly referred to as one-time-use cameras, have become well known. The one-time-use camera is a simple point-and-shoot type comprising a plastic main body part which supports a conventional film cassette in a cassette receiving or film take-up chamber, an unexposed film roll prewound on a film spool in a film supply chamber from the film cassette, a fixed-focus taking lens, a film metering mechanism with a rotatably supported metering sprocket that engages the filmstrip, a manually rotatable film winding thumbwheel rotatably engaged with a film spool inside the film cassette, a single-blade shutter, a manually depressible shutter release button, a rotatable frame counter for indicating the number of exposures remaining to be made on the filmstrip, a window for viewing the frame counter, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cassette, the one-time-use camera is given to a photofinisher who tears the outer box off the camera unit, separates the rear cover part from the main body part, and removes the film cassette with the exposed filmstrip from the film take-up chamber. Then, he removes the exposed filmstrip from the film cassette to develop the negatives and make prints for the customer. At least some of the used camera parts may be recycled, i.e. reused, to remanufacture the camera.

Problem

It is a continuing challenge to make one-time-use cameras as compact as is reasonably possible. This pursuit often involves the elimination of parts whenever possible.

SUMMARY OF THE INVENTION

A camera comprising a manually depressible release button for a shutter, and a frame counter for indicating the number of exposures remaining to be made on a filmstrip, is characterized in that:

the release button is at least partially transparent and the frame counter is beneath the release button to permit the frame counter to be seen through the release button, whereby there is no need for a separate window for viewing the frame counter.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
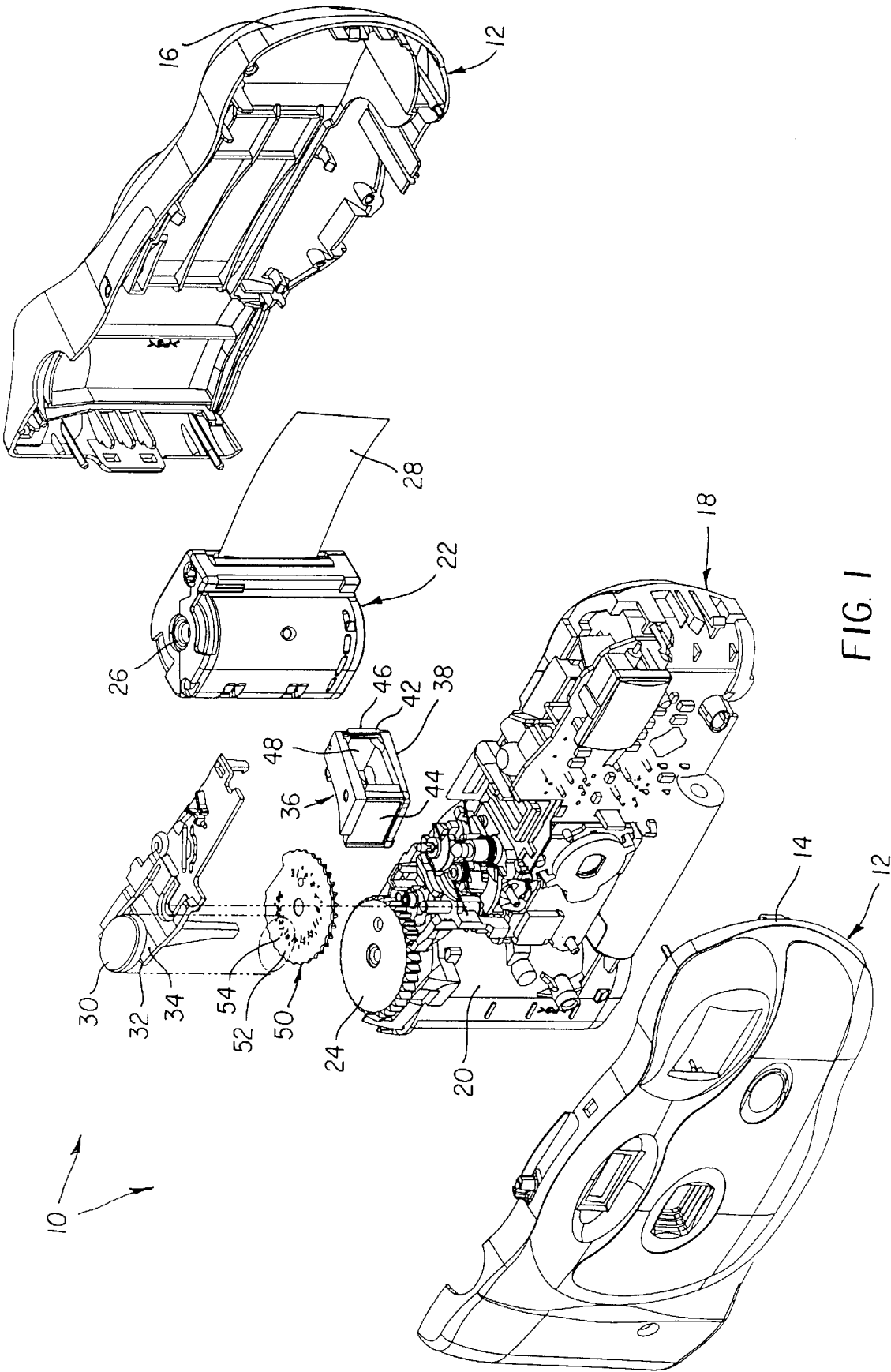
FIG. 1 is a an exploded front perspective view of a one-time-use camera according to a preferred embodiment of the invention.

Referring now to the drawings, FIG. 1 shows a one-time-use camera 10 in which an opaque camera housing 12 constitutes a front cover part 14 and a rear cover part 16. The front cover part 14 and the rear cover part 16 are connected to one another and to an opaque main body part 18 to house the main body part between them.

The main body part 18 has a cassette receiving or film take-up chamber 20 for a known film cassette 22. A film winding thumbwheel 24 rotatably supported on the top of the main body part is 18 is coaxially engaged with a film spool 26 inside the film cassette 22. After each picture is taken with the one-time-use camera 10, the photographer manually rotates the thumbwheel 24 in a film winding direction, counter-clockwise in FIG. 1, to similarly rotate the film spool 26 inside the film cassette 22. This winds an exposed section of a filmstrip 28 into the film cassette 22. A shutter release button 30 for actuating a known single-blade shutter, not shown, is integrally formed with a free end 32 of a resilient cantilevered beam 34 that is connected to the top of the main body part 18. The resilience of the cantilevered beam 34 permits the shutter release button 30 to be manually depressed to actuate the single-blade shutter, in order to effect picture-taking.

An optical viewfinder 36 has an open box-like skeletal frame 38 that is connected to the main body part 18. See FIG. 1. The skeletal frame 38 has an open front 40 and an open rear 42 in which a front objective lens 44 and a rear eye lens 46 are fixed. An air space 48 within the skeletal frame 38 separates the front objective and rear eye lenses 44 and 46. As is typical, a subject to be photographed is viewed through the viewfinder 36 when one's eye is brought close to, i.e. within approximately an inch of, the rear eye lens 46 to look at the subject through the viewfinder.

Figure 2:
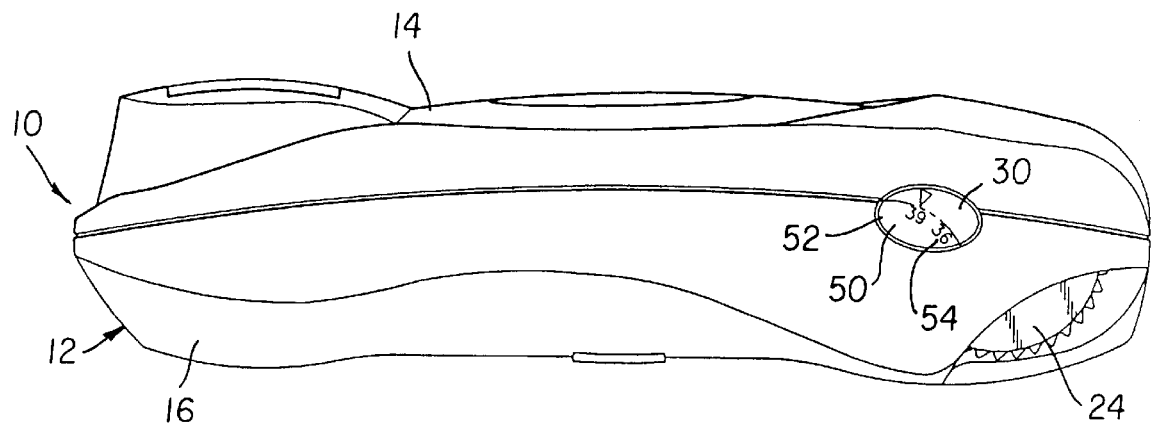
FIG. 2 is a top plan view of the one-time-use camera depicted in FIG. 1.
Figure 3:
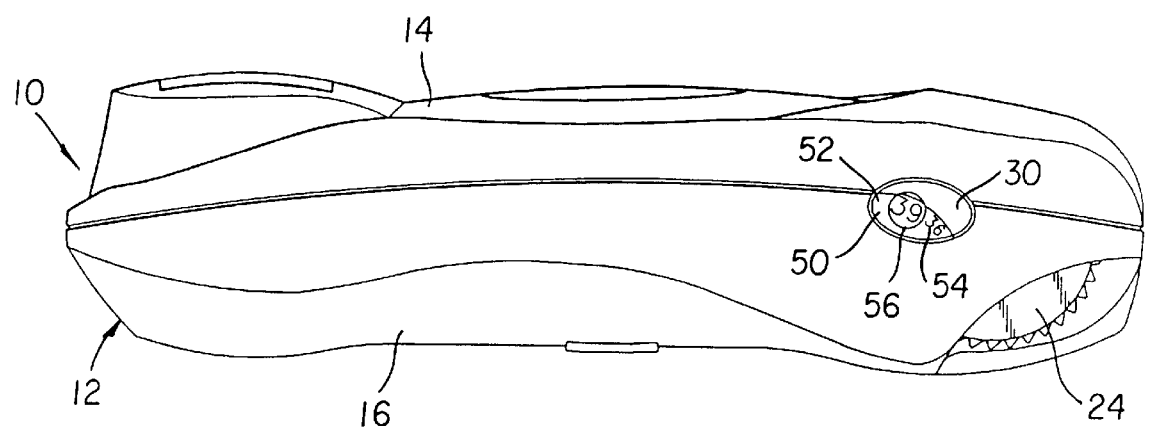
FIG. 3 is a top plan view of a one-time according to an alternate embodiment of the invention.

As shown in FIGS. 1 and 2, a known frame counter 50 for indicating the number of exposures remaining to be made on the filmstrip 28 is a rotatable counter wheel 52 with exposure related indicia 54. The shutter release button 30 is completely (or at least partially) transparent and is supported directly over the counter wheel 52 to permit the exposure related indicia 54 to be successively seen through the shutter release button when the counter wheel is rotated. The shutter release button 30, alternatively, as shown in FIG. 3, can include an integrally formed magnifier lens 56 for magnifying the view of the exposure related indicia 54.

The invention has been described with reference to a preferred embodiment. However, it will be appreciated that variations and modifications can be effected by a person of ordinary skill in the art without departing from the scope of the invention. For example, the shutter release button 30 can be only partially transparent such as only at the magnifier lens 56.

What is claimed is:

1. A camera comprising a manually depressible release button for a shutter, and a frame counter for indicating the number of exposures remaining to be made on a filmstrip, is characterized in that:

said release button has a built-in magnifier positioned with respect to said frame counter to permit said frame counter to be seen through said magnifier, whereby there is no need for a separate window for viewing said frame counter.

2. A camera comprising a manually depressible release button for a shutter, and a frame counter for indicating the number of exposures remaining to be made on a filmstrip, is characterized in that:

said release button has a built-in magnifier lens and said frame counter is beneath said magnifier lens to permit said frame counter to be seen through said magnifier lens.

* * * * *